US007843505B2

(12) United States Patent
Sano

(10) Patent No.: US 7,843,505 B2
(45) Date of Patent: Nov. 30, 2010

(54) IMAGE-CAPTURING DEVICE, IMAGE PROCESSING DEVICE AND IMAGE PROCESSING PROGRAM PRODUCT FOR IMAGE COMPOSITION PROCESSING

(75) Inventor: Hisashi Sano, Tokyo (JP)

(73) Assignee: Nikon Corporation, Tokyo (JP)

( * ) Notice: Subject to any disclaimer, the term of this patent is extended or adjusted under 35 U.S.C. 154(b) by 1421 days.

(21) Appl. No.: 11/269,625

(22) Filed: Nov. 9, 2005

(65) Prior Publication Data
US 2006/0103738 A1 May 18, 2006

(30) Foreign Application Priority Data
Nov. 12, 2004 (JP) ............................. 2004-328580

(51) Int. Cl.
*H04N 5/222* (2006.01)
(52) U.S. Cl. .................... 348/370; 348/222.1; 348/273
(58) Field of Classification Search ............. 348/222.1, 348/268–273, 370, 371; 382/162; 396/182
See application file for complete search history.

(56) References Cited
U.S. PATENT DOCUMENTS

2002/0191102 A1* 12/2002 Yuyama et al. ............. 348/370
2005/0046739 A1* 3/2005 Voss et al. ................. 348/371
2005/0254704 A1* 11/2005 Komiya et al. ............. 382/162
2005/0264685 A1* 12/2005 Hoshuyama et al. ........ 348/370
2007/0047946 A1* 3/2007 Helbing et al. ............. 396/182

FOREIGN PATENT DOCUMENTS

| JP | A-1-319369 | 12/1989 |
| JP | A-2-22993 | 1/1990 |
| JP | A 2003-287674 | 10/2003 |
| WO | WO 2004/012461 A1 | 2/2004 |

* cited by examiner

*Primary Examiner*—Gevell Selby
(74) *Attorney, Agent, or Firm*—Oliff & Berridge, PLC

(57) ABSTRACT

An image-capturing device includes: an image-capturing element that includes a first color filter that allows first color component light corresponding to a first color component to be transmitted and a second color filter that allows second color component light corresponding to a second color component different from the first color component to be transmitted, each formed in correspondence to one of light receiving pixels, and captures an image of a subject; an image-capturing control unit that engages the image-capturing element in a first image-capturing operation while the subject is illuminated with the first color component light and engages the image-capturing element in a second image-capturing operation while the subject is illuminated with the second color component light; and a pixel signal generating unit that generates a pixel signal corresponding to the first color component or the second color component at each pixel position based upon spectral characteristics of the first color filter, spectral characteristics of the second color filter, a pixel signal obtained through the first image-capturing operation and a pixel signal obtained through the second image-capturing operation.

19 Claims, 7 Drawing Sheets

US 7,843,505 B2

IMAGE-CAPTURING DEVICE, IMAGE PROCESSING DEVICE AND IMAGE PROCESSING PROGRAM PRODUCT FOR IMAGE COMPOSITION PROCESSING

INCORPORATION BY REFERENCE

The disclosure of the following priority application is herein incorporated by reference: Japanese Patent Application No. 2004-328580 filed Nov. 12, 2004

BACKGROUND OF THE INVENTION

1. Field of the Invention

The present invention relates to an image-capturing device that photographs an image through color filters for different colors, each disposed in correspondence to a pixel, and an image processing device that processes the image photographed with the image-capturing device.

2. Description of Related Art

An image signal output from an image-capturing element that includes color filters disposed with a specific color array such as a Bayer array contains information on one of color components R, G and B in correspondence to a given pixel. Namely, R color information is output from a pixel corresponding to an R color filter, G color information is output from a pixel corresponding to a G color filter and B color information is output from a pixel corresponding to a B color filter. This means that pixel information corresponding to an R color filter, for instance, contains R component information alone and does not include G component or B component information. Accordingly, color component information missing at each pixel position is calculated through interpolation processing in order to obtain information corresponding to all the color components R, G and B at the positions of all the pixels constituting an image (see Japanese Laid Open Patent Publication No. 2003-287674).

SUMMARY OF THE INVENTION

During the interpolation processing disclosed in Japanese Laid Open Patent Publication No. 2003-287674, color component information at a target pixel is generated by referencing the color component information available at pixels in close proximity to the target pixel and thus, color artifacts may manifest over an area where the subject image brightness or color changes abruptly.

According to the 1st aspect of the invention, an image-capturing device comprises: an image-capturing element that includes a first color filter that allows first color component light corresponding to a first color component to be transmitted and a second color filter that allows second color component light corresponding to a second color component different from the first color component to be transmitted, each formed in correspondence to one of light receiving pixels, and captures an image of a subject; an image-capturing control unit that engages the image-capturing element in a first image-capturing operation while the subject is illuminated with the first color component light and engages the image-capturing element in a second image-capturing operation while the subject is illuminated with the second color component light; and a pixel signal generating unit that generates a pixel signal corresponding to the first color component or the second color component at each pixel position based upon spectral characteristics of the first color filter, spectral characteristics of the second color filter, a pixel signal obtained through the first image-capturing operation and a pixel signal obtained through the second image-capturing operation.

According to the 2nd aspect of the invention, in the image-capturing device according to the 1st aspect, it is preferred that the pixel signal generating unit comprises: (1) a first pixel signal estimating unit which, based upon a ratio of a transmittance of the first color component light at the first color filter and a transmittance of the first color component light at the second color filter and a pixel signal corresponding to the first color component obtained through the first image-capturing operation from a pixel at which the second color filter is formed, estimates a pixel signal corresponding to the first color component that would be obtained if the first color filter was formed at the pixel; (2) a second pixel signal estimating unit which, based upon a ratio of a transmittance of the second color component light at the first color filter and a transmittance of the second color component light at the second color filter and a pixel signal corresponding to the second color component obtained through the second image-capturing operation from the pixel at which the second color filter is formed, estimates a pixel signal corresponding to the second color component that would be obtained if the first color filter was formed at the pixel; (3) a third pixel signal estimating unit which, based upon a ratio of the transmittance of the first color component light at the second color filter and the transmittance of the first color component light at the first color filter and a pixel signal corresponding to the first color component obtained through the first image-capturing operation from a pixel at which the first color filter is formed, estimates a pixel signal corresponding to the first color component that would be obtained if the second color filter was formed at the pixel; and (4) a fourth pixel signal estimating unit which, based upon a ratio of the transmittance of the second color component light at the second color filter and the transmittance of the second color component light at the first color filter and a pixel signal corresponding to the second color component obtained through the second image-capturing operation from the pixel at which the first color filter is formed, estimates a pixel signal corresponding to the second color component that would be obtained if the second color filter was formed at the pixel.

According to the 3rd aspect of the invention, in the image-capturing device according to the 2nd aspect, it is preferred that there is further provided an image composition unit that generates: (1) a post-composition pixel signal corresponding to the first color component for the pixel at which the second color filter is formed by calculating a sum of the pixel signal corresponding to the first color component having been estimated by the first pixel signal estimating unit and the pixel signal corresponding to the second color component having been estimated by the second pixel signal estimating unit; and (2) a post-composition pixel signal corresponding to the second color component for the pixel at which the first color filter is formed by calculating a sum of the pixel signal corresponding to the first color component having been estimated by the third pixel signal estimating unit and the pixel signal corresponding to the second color component having been estimated by the fourth pixel signal estimating unit.

According to the 4th aspect of the invention, in the image-capturing device according to the 1st aspect, it is preferred that: through the first color filter and the second color filter, the first color component light and the second color component light are respectively transmitted; and the transmittance of the second color component light is higher than the transmittance of the first color component light at the second color filter, and the transmittance of the first color component light is higher than the transmittance of the second color component light at the first color filter.

According to the 5th aspect of the invention, in the image-capturing device according to the 1st aspect, it is preferred that the first color component and the second color component constitute three primary colors of light.

According to the 6th aspect of the invention, in the image-capturing device according to the 1st aspect, it is preferred that: there is further provided an illuminating device capable of emitting the first color component light and the second color component light separately from each other; and the image-capturing control unit executes control so as to engage the illuminating device to emit the first component light and engage the image-capturing element in the first image-capturing operation, and executes control so as to engage the illuminating device to emit the second component light and engage the image-capturing element in the second image-capturing operation.

According to the 7th aspect of the invention, in the image-capturing device according to the 1st aspect, it is preferred that the pixel signal generating unit generates a pixel signal corresponding to the second color component for a pixel at which the first color filter is formed and generates a pixel signal corresponding to the first color component for a pixel at which the second color filter is formed, based upon the spectral characteristics of the first color filter, the spectral characteristics of the second color filter, the pixel signal obtained through the first image-capturing operation and the pixel signal obtained through the second image-capturing operation.

According to the 8th aspect of the invention, in the image-capturing device according to the 1st aspect, it is preferred that: the image-capturing element includes the first color filter, the second color filter and a third color filter which allows third color component light corresponding to a third color component different from the first color component and the second color component to be transmitted, each formed in correspondence to one of the light receiving pixels; the image-capturing control unit engages the image-capturing element in a third image-capturing operation while the subject is illuminated with the third color component light; and the pixel signal generating unit generates a pixel signal corresponding to the second color component and a pixel signal corresponding to the third color component for a pixel for the first color component, generates a pixel signal corresponding to the first color component and a pixel signal corresponding to the third color component for a pixel for the second color component and generates a pixel signal corresponding to the first color component and a pixel signal corresponding to the second color component for a pixel for the third color component, based upon the spectral characteristics of the first color filter, the spectral characteristics of the second color filter, spectral characteristics of the third color filter, the pixel signal obtained through the first image-capturing operation, the pixel signal obtained through the second image-capturing operation and the pixel signal obtained through the third image-capturing operation.

According to the 9th aspect of the invention, in the image-capturing device according to the 8th aspect, it is preferred that the first color component, the second color component and the third color component constitute three primary colors of light.

According to the 10th aspect of the invention, an image processing device comprises: an acquisition device that obtains a first image and a second image captured at an image-capturing element that includes a first color filter allowing first color component light corresponding to a first color component to be transmitted and a second color filter allowing second color component light corresponding to a second color component different from the first color component to be transmitted, each formed in correspondence to one of light receiving pixels, respectively while a subject is illuminated with the first color component light and while the subject is illuminated with the second color component light; and a pixel signal generating unit that generates a pixel signal corresponding to the first color component or a pixel signal corresponding to the second color component at each pixel position based upon spectral characteristics of the first color filter, spectral characteristics of the second color filter, a pixel signal constituting the first image and a pixel signal constituting the second image.

According to the 11th aspect of the invention, in the image processing device according to the 10th aspect, it is preferred that the pixel signal generating unit comprises: (1) a first pixel signal estimating unit which, based upon a ratio of transmittance of the first color component light at the first color filter and a transmittance of the first color component light at the second color filter and a pixel signal corresponding to the first color component that constitutes the first image and is obtained from a pixel at which the second color filter is formed, estimates a pixel signal corresponding to the first color component that would be obtained if the first color filter was formed at the pixel; (2) a second pixel signal estimating unit which, based upon a ratio of transmittance of the second color component light at the first color filter and a transmittance of the second color component light at the second color filter and a pixel signal corresponding to the second color component that constitutes the second image and is obtained from the pixel at which the second color filter is formed, estimates a pixel signal corresponding to the second color component that would be obtained if the first color filter was formed at the pixel; (3) a third pixel signal estimating unit which, based upon a ratio of the transmittance of the first color component light at the second color filter and the transmittance of the first color component light at the first color filter and a pixel signal corresponding to the first color component that constitutes the first image and is obtained from a pixel at which the first color filter is formed, estimates a pixel signal corresponding to the first color component that would be obtained if the second color filter was formed at the pixel; and (4) a fourth pixel signal estimating unit which, based upon a ratio of the transmittance of the second color component light at the second color filter and the transmittance of the second color component light at the first color filter and a pixel signal corresponding to the second color component that constitutes the second image and is obtained from the pixel at which the first color filter is formed, estimates a pixel signal corresponding to the second color component that would be obtained if the second color filter was formed at the pixel.

According to the 12th aspect of the invention, in the image-processing device according to the 11th aspect, it is preferred that there is further provided an image composition unit that generates: (1) a post-composition pixel signal corresponding to the first color component for the pixel at which the second color filter is formed by calculating a sum of the pixel signal corresponding to the first color component having been estimated by the first pixel signal estimating unit and the pixel signal corresponding to the second color component having been estimated by the second pixel signal estimating unit; and (2) a post-composition pixel signal corresponding to the second color component for the pixel at which the first color filter is formed by calculating a sum of the pixel signal corresponding to the first color component having been estimated by the third pixel signal estimating unit and the pixel signal corresponding to the second color component having been estimated by the fourth pixel signal estimating unit.

According to the 13th aspect of the invention, in the image processing device according to the 10th aspect, it is preferred that the pixel signal generating unit generates a pixel signal corresponding to the second color component for a pixel at which the first color filter is formed and generates a pixel signal corresponding to the first color component for a pixel at which the second color filter is formed, based upon the spectral characteristics of the first color filter, the spectral characteristics of the second color filter, the pixel signal constituting the first image and the pixel signal constituting the second image.

According to the 14th aspect of the invention, in the image processing device according to the 10th aspect, it is preferred that: the acquisition device obtains the first image, the second image and a third image obtained at an image-capturing element, which includes the first color filter allowing the first color component light corresponding to the first color component to be transmitted, the second color filter allowing the second color component light corresponding to the second color component different from the first color component to be transmitted and a third color filter allowing third color component light corresponding to a third color component different from the first color component the second color component to be transmitted, each formed in correspondence to one of light receiving pixels, respectively while a subject is illuminated with the first color component light, while the subject is illuminated with the second color component light and while the subject is illuminated with the third color component light; and the pixel signal generating unit generates a pixel signal corresponding to the second color component and a pixel signal corresponding to the third color component for a pixel for the first color component, generates a pixel signal corresponding to the first color component and a pixel signal corresponding to the third color component for a pixel for the second color component and generates a pixel signal corresponding to the first color component and a pixel signal corresponding to the second color component for a pixel for the third color component based upon the spectral characteristics of the first color filter, the spectral characteristics of the second color filter, spectral characteristics of the third color filter, the pixel signal constituting the first image, the pixel signal constituting the second image and a pixel signal constituting the third image.

According to the 15th aspect of the invention, a computer-readable computer program product contains therein an image processing program. The image processing program comprises: (1) image acquisition processing for obtaining a first image and a second image captured at an image-capturing element, which includes a first color filter allowing first color component light corresponding to a first color component to be transmitted and a second color filter allowing second color component light corresponding to a second color component different from the first color component to be transmitted, each formed in correspondence to one of light receiving pixels, respectively while a subject is illuminated with the first color component light and while the subject is illuminated with the second color component light; (2) first pixel signal estimate processing for estimating, based upon a ratio of a transmittance of the first color component light at the first color filter and a transmittance of the first color component light at the second color filter and a pixel signal corresponding to the first color component that constitutes the first image and is obtained from a pixel at which the second color filter is formed, a pixel signal corresponding to the first color component that would be obtained if the first color filter was formed at the pixel; (3) second pixel signal estimate processing for estimating, based upon a ratio of a transmittance of the second color component light at the first color filter and a transmittance of the second color component light at the second color filter and a pixel signal corresponding to the first color component that constitutes the second image and is obtained from the pixel at which the second color filter is formed, a pixel signal corresponding to the second color component that would be obtained if the first color filter was formed at the pixel; (4) third pixel signal estimate processing for estimating, based upon a ratio of the transmittance of the first color component light at the second color filter and the transmittance of the first color component light at the first color filter and a pixel signal corresponding to the first color component that constitutes the first image and is obtained from a pixel at which the first color filter is formed, a pixel signal corresponding to the first color component that would be obtained if the second color filter was formed at the pixel; (5) fourth pixel signal estimate processing for estimating, based upon a ratio of the transmittance of the second color component light at the second color filter and the transmittance of the second color component light at the first color filter and a pixel signal corresponding to the second color component that constitutes the second image and is obtained from the pixel at which the first color filter is formed, a pixel signal corresponding to the second color component that would be obtained if the second color filter was formed at the pixel; and (6) image composition processing for generating a post-composition pixel signal corresponding to the first color component for the pixel at which the second color filter is formed by calculating a sum of the pixel signal corresponding to the first color component having been estimated through the first pixel signal estimate processing and the pixel signal corresponding to the second color component having been estimated through the second pixel signal estimate processing and for generating a post-composition pixel signal corresponding to the second color component for the pixel at which the first color filter is formed by calculating a sum of the pixel signal corresponding to the first color component having been estimated through the third pixel signal estimate processing and the pixel signal corresponding to the second color component having been estimated through the fourth pixel signal estimate processing.

According to the 16th aspect of the invention, in the computer-readable computer program product according to the 15th aspect, it is preferred that the computer-readable computer program product is a recording medium on which the image processing program is recorded.

DESCRIPTION OF PREFERRED EMBODIMENT

Figure 1:
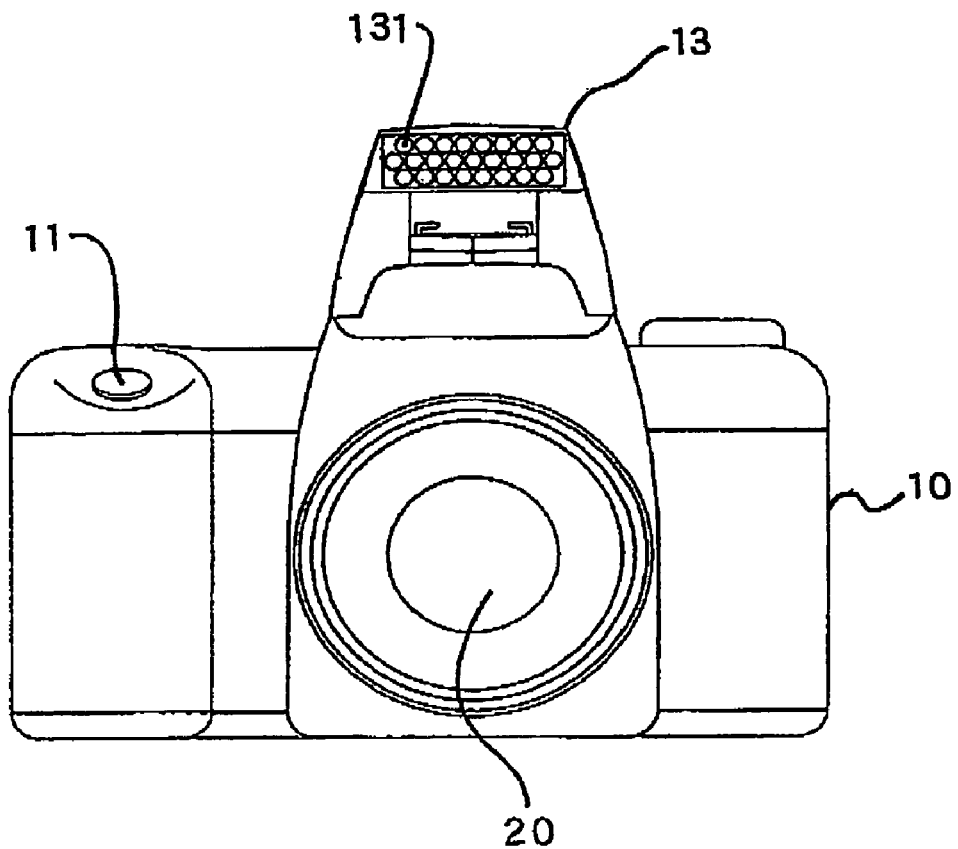
FIG. 1 is an external view of the single lens reflex electronic camera achieved in an embodiment of the present invention.

The following is an explanation of a preferred embodiment of the present invention, given in reference to the drawings. FIG. 1 is an external view of the single lens reflex electronic camera achieved in the embodiment of the present invention. FIG. 1 shows an exchangeable photographic lens 20 mounted at an electronic camera body 10. A shutter release button 11 is disposed at an upper left position at the electronic camera body 10, viewed from the subject side, whereas a pop-up type illuminating device 13 is disposed at the top center of the electronic camera body 10. The illuminating device 13 in FIG. 1 has been popped up to the operating position. The illuminating device 13 adopts a structure that allows a plurality of LEDs (light emitting diode) modules 131 which are provided as a light emitting member, to face toward the subject when the device is popped up.

Figure 2:
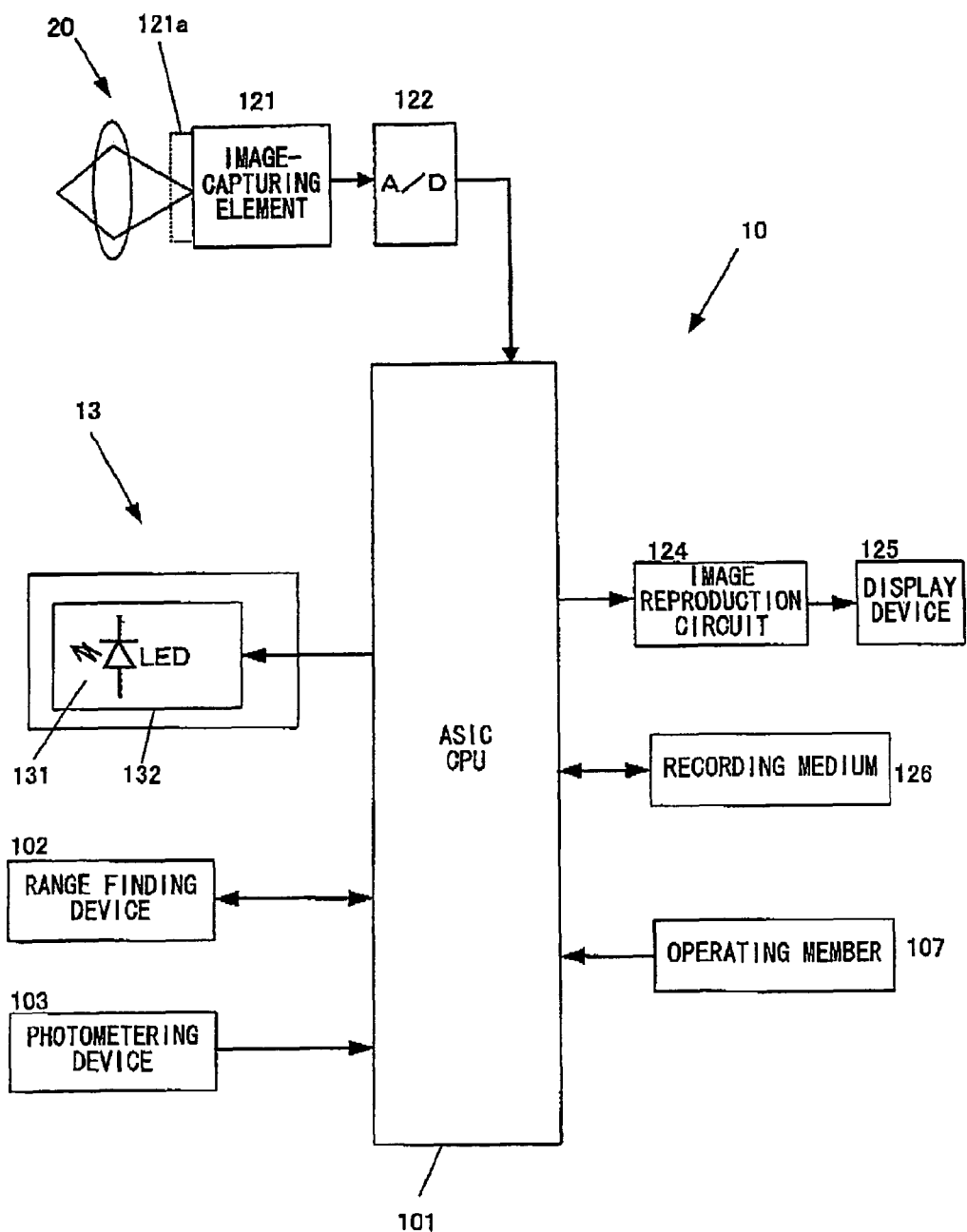
FIG. 2 is a block diagram showing the essential structure adopted in the electronic camera body.

FIG. 2 is a block diagram of the essential structure adopted in the electronic camera body 10 in FIG. 1. A CPU 101 in FIG. 2 is constituted with an ASIC and the like. The CPU 101 executes specific arithmetic operations by using signals input thereto from various blocks to be detailed later and outputs control signals generated based upon the arithmetic operation results to the individual blocks.

A subject light flux having entered the camera body 10 through the photographic lens 20 is guided to an image-capturing element 121. The image-capturing element 121 is constituted with a CCD image sensor or the like. The image-capturing element 121 captures an image formed with the subject light flux and outputs an image-capturing signal to an A/D conversion circuit 122. The A/D conversion circuit 122 converts the analog image-capturing signal to digital a signal.

The CPU 101 executes image processing such as white balance processing on image data resulting from the digital conversion and it also executes compression processing for compressing the image data that have undergone the image processing into a predetermined format, decompression processing for decompressing compressed data and the like. A recording medium 126 is constituted with a memory card or the like that can be detachably loaded into the electronic camera body 10. The image data having undergone the image processing are recorded into the recording medium 126.

An image reproduction circuit 124 generates data for reproduction display by using uncompressed image data (image data that have not yet been compressed or decompressed image data). At a display device 125, which may be constituted with a liquid crystal display monitor, for instance, an image reproduced by using the reproduction display data is displayed.

A range finding device 102 detects the state of the focal point position adjustment achieved through the photographic lens 20 and outputs a detection signal to the CPU 101. Based upon the focal point detection signal, the CPU 101 issues a command for a focus lens drive mechanism (not shown) so as to drive a focus lens (not shown) included in the photographic lens 20 forward/backward along the optical axis, and thus the focal point position is adjusted with the photographic lens 20. The focal point adjustment information corresponds to distance information indicating the distance to a main subject.

A photometering device 103 detects the quantity of subject light and outputs a detection signal to the CPU 101. The CPU 101 calculates the light output to be achieved at the illuminating device 13 and a control exposure value through exposure calculation executed by using the detection signal.

An operating member 107 includes a shutter release switch which interlocks with an operation of the shutter release button 11 (see FIG. 1) and the like, and outputs operation signals corresponding to operations at the individual switches to the CPU 101.

The illuminating device 13 includes a plurality (25 modules in the example presented in FIG. 1) of LED modules 131 and light emission circuits 132 that engage the LED modules 131 in light emission. Each LED module 131 includes a light emitting element that emits red color (R component) light, a light emitting element that emits green color (G component) light and a light emitting element that emits blue color (B component) light. Upon receiving from the CPU timing signals indicating an LED light emission start and an LED light emission end, a signal indicating the desired light emission intensity (brightness) and the like, a light emission circuit 132 executes ON control for the light emitting elements corresponding to the individual colors based upon the signals having been received. It is to be noted that if a setting that disables light emission at the illuminating device 13 is selected in the electronic camera 10 (including when the illuminating device 13 has not been popped up to the operating position), the CPU 101 does not output a light emission instruction signal.

Figure 3:
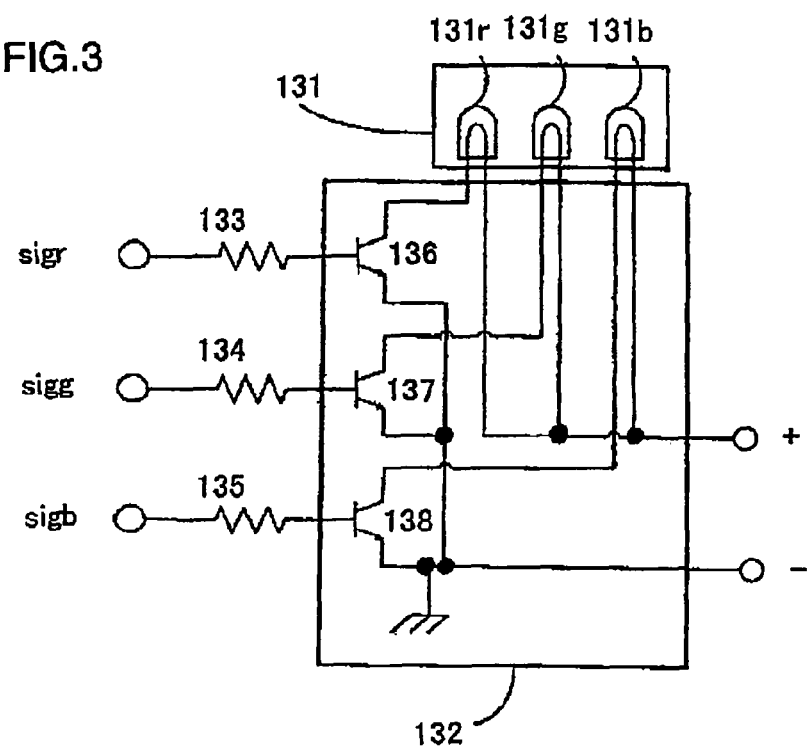
FIG. 3 presents a structural example that may be adopted in the light emission circuits.

FIG. 3 presents a structural example that may be adopted in the light emission circuits 132. As FIG. 3 shows, a single LED module 131 includes a light emitting element 131r which emits light containing the R component, a light emitting element 131g that emits light containing the G component and a light emitting element 131b that emits light containing the B component. A predetermined level of. DC voltage (e.g., 3 V) required for the drive of the LED module 131 is applied from a power source circuit (not shown) to the light emission circuits 132 between its source terminal+ and its source terminal−.

The R component light emitting element 131r emits light as the CPU 101 sets a light emission signal sigr to high level. Namely, the light emitting element 131r emits R component light as a base current is supplied to a transistor 136 via a base resistor 133 and the transistor 136 supplies a collector current corresponding to the base current to the light emitting element 131r.

The G component light emitting element 131g emits light as the CPU 101 sets a light emission signal sigg to high level. Namely, the light emitting element 131g emits G component light as a base current is supplied to a transistor 137 via a base resistor 134 and the transistor 137 supplies a collector current corresponding to the base current to the light emitting element 131g.

The B component light emitting element 131b emits light as the CPU 101 sets a light emission signal sigb to high level. Namely, the light emitting element 131b emits B component light as a base current is supplied to a transistor 138 via a base resistor 135 and the transistor 138 supplies a collector current corresponding to the base current to the light emitting element 131b.

Since the LED modules 131 each include the light emitting elements for emitting R component light, G component light and B component light, which can be individually selected for light emission, independent ON control can be executed to select light emission/non-light emission and specific colors of light to be emitted for the individual LED modules 131. The color of the mixed color light generated by simultaneously turning on the light emitting element 131r, the light emitting element 131g and the light emitting element 131b is white.

The light emission circuits 132 structured as described above are provided each in correspondence to an LED module 131. The signal levels of the light emission signals sigr, sigg and sigb for the LED modules 131 are determined by the CPU 101.

As is known in the related art, a light emitting element (LED) is a current-controlled device that manifests a proportional relationship between the drive current and the light emission intensity within its rated range. By controlling the light emission signals (base currents) provided to the individual transistors, the CPU 101 controls the quantity and the color of light emitted from each LED module 131 independently. The relationships between the light emission intensity levels at the light emitting elements 131r, 131g and 131b the electrical currents supplied thereto are stored in advance as a table in a nonvolatile memory in the CPU 101. The CPU 101 references the table by using a specific light emission intensity level as an argument and determines the necessary electrical current to be supplied. The CPU 101 then indicates the current value to the light emission circuit 132. In response to the command output by the CPU 101, the light emission circuits 132 supplies the electrical current to the individual light emitting elements 131r, 131g and 131b.

(Illuminating Light Spectral Emission Intensity Characteristics)

Figure 4:
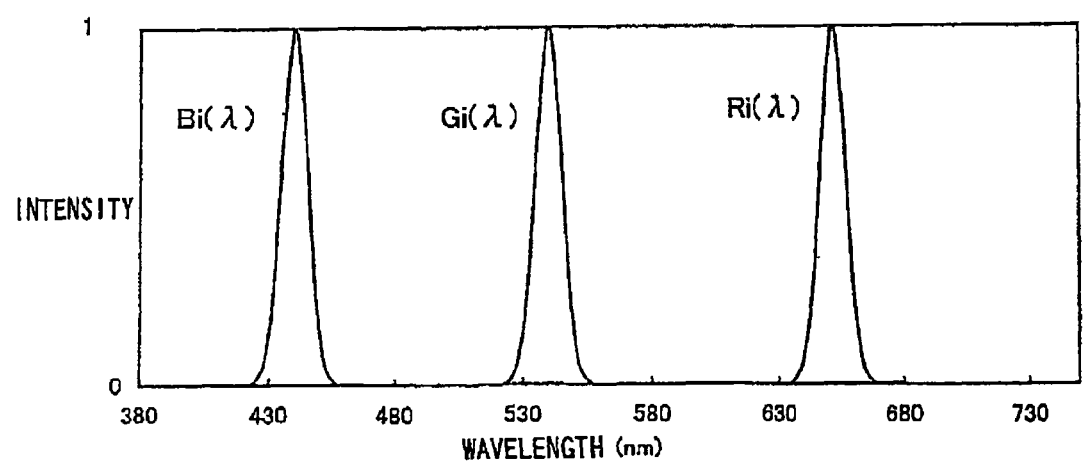
FIG. 4 presents an example of illuminating light spectral emission intensity characteristics that may manifest at the LED modules.

FIG. 4 presents an example of illuminating light spectral emission intensity characteristics that may be achieved with the LED module 131. The horizontal axis and the vertical axis in FIG. 4 respectively represent the light emission (radiation) wavelength (unit: nm) and the light emission (radiation) intensity. Along the vertical axis, the light emission intensity is indicated as a value relative to the value of 1 taken for the maximum light emission intensity value.

Among the waveforms corresponding to the three "spikes" in FIG. 4, the waveform on the left side represents the B component light, which is expressed as a function $Bi(\lambda)$ of the wavelength $\lambda$. The waveform corresponding to the "spike" at the center in FIG. 4 represents the G component light, which is expressed as a function $Gi(\lambda)$ of the wavelength $\lambda$. The waveform corresponding to the "spike" on the right side in FIG. 4 represents the R component light, which is expressed as a function $Ri(\lambda)$ of the wavelength $\lambda$. Namely, the individual waveforms indicate the spectral emission intensity characteristics of the light sources, i.e., the light emitting elements 131r, 131g and 131b, constituting the LED module 131.

In order to simplify the explanation it is assumed that the three waveforms in FIG. 4 achieve maximal values equal to one another in the example. A crucial feature of the embodiment is that the wave band of each "spike" is narrow (e.g., the spectral full width at half maximum is 30 nm) with the ratio of the maximal value and the minimal value achieving a value equal to or greater than a predetermined value (e.g., 10:1), rather than that light corresponding to the three primary color wavelengths is emitted at equal intensity levels from the LED module 131.

(Spectral Sensitivity Characteristics of the Image-Capturing Element)

A spectral filter (color filter) 121a is disposed on a pixel area formed at the image-capturing surface of the image-capturing element 121 (see FIG. 2). The color filter 121a is a color separation filter constituted by disposing primary color filters, each of which allows light mainly containing the R component, light mainly containing the G component or light mainly containing the B component to be transmitted, in correspondence to the positions of the individual pixels in a specific array (e.g., a Bayer array). By capturing a subject image through such a color filter 121a, the image-capturing element 121 outputs image-capturing signals each corresponding to one of the three primary colors of light.

Figure 5:
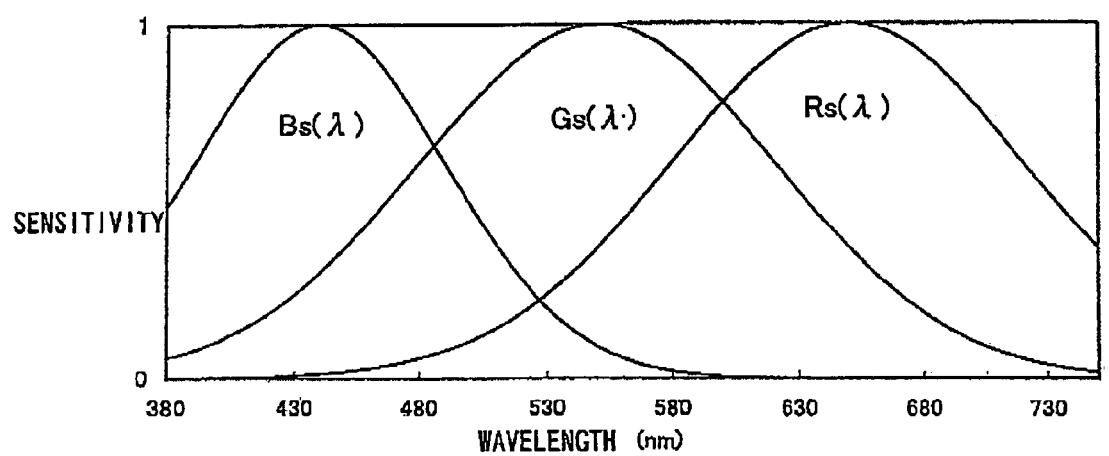
FIG. 5 presents an example of spectral sensitivity characteristics that may manifest at the image-capturing element.

The maximal light emission wavelengths at the LED module 131 described earlier are designed to correspond with the maximal transmission wavelength indicated as the spectral transmission characteristics of the color filter 121a. FIG. 5 presents an example of spectral sensitivity characteristics that may be achieved at the image-capturing element 121. These spectral sensitivity characteristics are obtained by incorporating the spectral transmission characteristics at the color filter 121a, the wavelength sensitivity characteristics of the photo diodes constituting the pixels at the image-capturing element 121 and the infrared light cutoff characteristics of an infrared light-blocking filter (not shown) disposed at the image-capturing surface of the image-capturing element 121 separately from the color filter 121a.

The horizontal axis and the vertical axis in FIG. 5 respectively represent the wavelength of received light (unit: nm) and the light reception sensitivity. Along the vertical axis, the light reception sensitivity level is indicated as a value relative to the value of 1 taken for the maximum light reception sensitivity level. Among the waveforms corresponding to the three "hills" in FIG. 5, the waveform on the left side represents the sensitivity characteristics with regard to the B component light, which is expressed as a function $Bs(\lambda)$ of the wavelength $\lambda$. The waveform corresponding to the "hill" at the center in FIG. 5 represents the sensitivity characteristics with regard to the G component light, which is expressed as a function $Gs(\lambda)$ of the wavelength $\lambda$. The waveform corresponding to the "hill" on the right side in FIG. 5 represents the sensitivity characteristics of the R component light, which is expressed as a function $Rs(\lambda)$ of the wavelength $\lambda$.

The electronic camera according to the present invention captures an image with the image-capturing element 121 achieving the spectral sensitivity characteristics described above by emitting light from the illuminating device 13 achieving the spectral emission intensity characteristics described earlier.

The intensity of the color component in the subject light flux, which corresponds to the wavelength of the maximal light emitted from the LED modules 131 becomes more pronounced when the illuminating device 13 is turned on to illuminate the main subject while electrical charges are being stored at the image-capturing element 121 during a photographing operation. The image-capturing signal values corresponding to the R, G and B color components are respectively indicated as in (1) through (3) below.

$$R = \int \{[Ri(\lambda)+Gi(\lambda)+Bi(\lambda)] \cdot A(\lambda) \cdot Rs(\lambda)\} d\lambda \qquad (1)$$

$$G = \int \{[Ri(\lambda)+Gi(\lambda)+Bi(\lambda)] \cdot A(\lambda) \cdot Gs(\lambda)\} d\lambda \qquad (2)$$

$$B = \int \{[Ri(\lambda)+Gi(\lambda)+Bi(\lambda)] \cdot A(\lambda) \cdot Bs(\lambda)\} d\lambda \qquad (3)$$

with the spectral reflectance of the subject expressed as a function $A(\lambda)$ of the wavelength $\lambda$.

The image-capturing values signal expressed in (1) through (3) above are each the signal value output from a pixel at which a color filter for the corresponding color component is disposed. The expression (2) for the G color component can be expanded to expression (4) below.

$$G = \int \{Ri(\lambda) \cdot A(\lambda) \cdot Gs(\lambda)\} d\lambda + \int \{Gi(\lambda) \cdot A(\lambda) \cdot Gs(\lambda)\} d\lambda + \int \{Bi(\lambda) \cdot A(\lambda) \cdot Gs(\lambda)\} d\lambda \qquad (4)$$

The first term in expression (4) represents the image-capturing signal value indicated at a pixel at which a G color filter is disposed when the light emitting element 131r alone is turned on in the LED module 131. The second term in expression (4) represents the image-capturing signal value indicated at a pixel at which the G color filter is disposed when the light emitting element 131g alone is turned on in the LED module 131. The third term in expression (4) represents the image-capturing signal value indicated at the pixel at which the G color filter is disposed when the light emitting element 131b alone is turned on in the LED module 131.

With Gr, Gg and Gb respectively representing the first term, the second term and the third term in expression (4), the image-capturing signal value obtained at the pixel corresponding to the G color filter is expressed as in (5) below.

$$G=Gr+Gg+Gb \quad (5)$$

Likewise, the expression (1) for the R color component can be expanded to expression (6) below.

$$R = \int \{Ri(\lambda) \cdot A(\lambda) \cdot Rs(\lambda)\} d\lambda + \int \{Gi(\lambda) \cdot A(\lambda) \cdot Rs(\lambda)\} d\lambda + \int \{Bi(\lambda) \cdot A(\lambda) \cdot Rs(\lambda)\} d\lambda \quad (6)$$

The first term in expression (6) represents the image-capturing signal value indicated at a pixel at which an R color filter is disposed when the light emitting element 131r alone is turned on in the LED module 131. The second term in expression (6) represents the image-capturing signal value indicated at the pixel at which the R color filter is disposed when the light emitting element 131g alone is turned on in the LED module 131. The third term in expression (6) represents the image-capturing signal value indicated at a pixel at which a R color filter is disposed when the light emitting element 131b alone is turned on in the LED module 131.

With Rr, Rg and Rb respectively representing the first term, the second term and the third term in expression (6), the image-capturing signal value obtained at the pixel corresponding to the R color filter is expressed as in (7) below.

$$R=Rr+Rg+Rb \quad (7)$$

Likewise, the expression (3) for the B color component can be expanded to expression (8) below.

$$B = \int \{Ri(\lambda) \cdot A(\lambda) \cdot Bs(\lambda)\} d\lambda + \int \{Gi(\lambda) \cdot A(\lambda) \cdot Bs(\lambda)\} d\lambda + \int \{Bi(\lambda) \cdot A(\lambda) \cdot Bs(\lambda)\} d\lambda \quad (8)$$

The first term in expression (8) represents the image-capturing signal value indicated at a pixel at which a B color filter is disposed when the light emitting element 131r alone is turned on in the LED module 131. The second term in expression (8) represents the image-capturing signal value indicated at a pixel at which a B color filter is disposed when the light emitting element 131g alone is turned on in the LED module 131. The third term in expression (8) represents the image-capturing signal value indicated at a pixel at which a B color filter is disposed when the light emitting element 131b alone is turned on in the LED module 131.

With Br, Bg and Bb respectively representing the first term, the second term and the third term in expression (8), the image-capturing signal value obtained at the pixel corresponding to the B color filter is expressed as in (9) below.

$$B=Br+Bg+Bb \quad (9)$$

Expressions (5), (7) and (9) in FIGS. 4 and 5 indicate that the image-capturing signal values are each represented by the sum of the signals of received light corresponding to the different color components, since the wave band of the "hills" in the spectral sensitivity characteristics is greater in comparison to the spectral width of the spectral emission intensity characteristics at the light emitting elements 131r, 131g and 131b and the individual (3) maximal wavelengths of light emitted at the LED module 131 are contained in the transmission range corresponding to each "hill".

The image-capturing signal values corresponding to the individual color components are obtained by emitting R component light, G component light and B component light from the illuminating device 13 through time division. Namely, the CPU 101 sequentially turns on the light emitting elements in the order of the light emitting elements 131r, the light emitting elements 131g and then the light emitting elements 131b at the LED modules 131 in the illuminating device 13. The image-capturing element 121 stores electrical charges with the timing with which the light corresponding to each color component is emitted.

The electrical charge signals (image-capturing signals) stored at the image-capturing element 121 while the R component light is emitted, the electrical charge signals (image-capturing signals) stored while the G component light is emitted and the electrical charge signals (image-capturing signals) stored while the B component light is emitted are read out sequentially from the image-capturing element 121. The CPU 101 temporarily stores image data Ri obtained by digitizing the image-capturing signals corresponding to the R component light, image data Gi obtained by digitizing the image-capturing signals corresponding to the G component light and image data Bi obtained by digitizing the image-capturing signals corresponding to the B component light individually into a buffer memory (not shown).

The image data Ri contain Rr signals obtained at pixels corresponding to R component color filters, Gr signals obtained at pixels corresponding to G component color filters and Br signals obtained at pixels corresponding to B component color filters.

The image data Gi contain Rg signals obtained at the pixels corresponding to R component color filters, Gg signals obtained at the pixels corresponding to G component color filters and Bg signals obtained at the pixels corresponding to the B component color filters.

The image data Bi contain Rb signals obtained at the pixels corresponding to R component color filters, Gb signals obtained at the pixels corresponding to G component color filters and Bb signals obtained at the pixels corresponding to the B component color filters.

(Interpolation Processing)

From a pixel corresponding to a G component color filter, an image-capturing signal containing information that indicates Gr, Gg and Gb only is output, and information indicating Rr, Rg and Rb or Br, Bg and Bb is not included in the image-capturing signal output from the particular pixel. For this reason, it is necessary to generate missing information through interpolation in order to obtain the full information indicating Gr, Gg, Gb, Rr, Rg, Rb, Br, Bg, Bb in correspondence to each pixel position.

In the embodiment, the missing color component information is generated through estimation.

1. Estimate the Signal Rr at a Pixel Position Corresponding to a G Component Color Filter The R component information obtained at a pixel corresponding to a G component color filter is the signal Gr. Assuming that the R component light (Ri(λ)) has a narrow wave band and is single-color light, the following expression (10) can be deduced from the spectral sensitivity characteristics shown in FIG. 5.

$$Rr/Gr \approx Rs(\lambda r)/Gs(\lambda r) \qquad (10)$$

with $\lambda r$ representing the wavelength at which $Ri(\lambda)$ achieves the maximum value. Since Gr, $Rs(\lambda)$, $Gs(\lambda)$ and $\lambda r$ in expression (10) are already known, the CPU 101 uses these known values for substitution in expression (10) to determine the value of the signal Rr. With expression (10) above, the R component information (signal Rr) can be estimated based upon the ratio of the sensitivity characteristics $Rs(\lambda r)$ of the R component light at the known R component wavelength $\lambda r$ and the sensitivity characteristics $Gs(\lambda r)$ of the G component light at the known wavelength $\lambda r$ and the R component signal value Gr which has been actually obtained. It is to be noted that data indicating the spectral emission intensity characteristics $Bi(\lambda)$, $Gi(\lambda)$ and $Ri(\lambda)$ and the spectral sensitivity characteristics $Bs(\lambda)$, $Gs(\lambda)$ and $Rs(\lambda)$ are stored in advance in nonvolatile memory (not shown) within the CPU 101.

As explained earlier, the spectral sensitivity characteristics $Bs(\lambda)$, $Gs(\lambda)$ and $Rs(\lambda)$ are projected by incorporating the spectral transmission characteristics at its individual color filters, the wavelength sensitivity characteristics of the photo diodes and the infrared light-cutoff characteristics of the infrared light blocking filter (not shown). However, the spectral sensitivity characteristics $Bs(\lambda)$, $Gs(\lambda)$ and $Rs(\lambda)$ are greatly affected respectively by the spectral transmission characteristics of the B component color filters, the G component color filters and the R component color filters. For this reason, the spectral sensitivity characteristics $Bs(\lambda)$, $Gs(\lambda)$ and $Rs(\lambda)$ can be regarded as indicating the spectral transmission characteristics of the B component color filters, the G component color filters and the R component color filters respectively. In addition, the spectral transmission characteristics can be referred to as characteristics indicating the transmittance factors of the light with the individual wavelengths at the individual color filters. Accordingly, the ratio of the sensitivity characteristics $Rs(\lambda r)$ of the R component light in the R component wavelength $\lambda r$ and the sensitivity characteristics $Gs(\lambda r)$ of the G component light in the R component wavelength $\lambda r$ mentioned earlier can be regarded as the ratio of the transmittance of the light with the R component wavelength $\lambda r$ at an R component color filter and the transmittance of the light at a G component color filter.

2. Estimate the Signal Rg at a Pixel Position Corresponding to a G Component Color Filter The G component information obtained at a pixel corresponding to a G component color filter is the signal Gg. Assuming that the G component light $(Gi(\lambda))$ has a narrow wave band and is single-color light, the following expression (11) can be deduced from the spectral sensitivity characteristics shown in FIG. 5.

$$Rg/Gg \approx Rs(\lambda g)/Gs(\lambda g) \qquad (11)$$

with $\lambda g$ representing the wavelength at which $Gi(\lambda)$ achieves the maximum value. Since Gg, $Rs(\lambda)$, $Gs(\lambda)$ and $\lambda g$ in expression (11) are already known, the CPU 101 uses these known values for substitution in expression (11) to determine the value of the signal Rg. With expression (11) above, the G component information (signal Rg) can be estimated based upon the ratio of the sensitivity characteristics $Rs(\lambda g)$ of the R component light at the known wavelength $\lambda g$ and the sensitivity characteristics $Gs(\lambda g)$ of the G component light at the known wavelength $\lambda g$ and the G component signal value Gg which has been actually obtained.

3. Estimate the Signal Rb at a Pixel Position Corresponding to a G Component Color Filter The B component information obtained at a pixel corresponding to a G component color filter is the signal Gb. Assuming that the B component light $(Bi(\lambda))$ has a narrow wave band and is single-color light, the following expression (12) can be deduced from the spectral sensitivity characteristics shown in FIG. 5.

$$Rb/Gb \approx Rs(\lambda b)/Gs(\lambda b) \qquad (12)$$

with $\lambda b$ representing the wavelength at which $Si(\lambda)$ achieves the maximum value. Since Gb, $Rs(\lambda)$, $Gs(\lambda)$ and $\lambda b$ in expression (12) are already known, the CPU 101 uses these known values for substitution in expression (12) to determine the value of the signal Rb. With expression (12) above, the B component information (signal Rb) can be estimated based upon the ratio of the sensitivity characteristics $Rs(\lambda b)$ of the R component light at the known B component wavelength $\lambda b$ and the sensitivity characteristics $Gs(\lambda b)$ of the G component light at the known wavelength $\lambda b$ and the B component signal value Gb which has been actually obtained.

4. Estimate the Signal Bb at a Pixel Position Corresponding to a G Component Color Filter The B component information obtained at a pixel corresponding to a G component color filter is the signal Gb. Assuming that the B component light $(Bi(\lambda))$ has a narrow wave band and is single-color light, the following expression (13) can be deduced from the spectral sensitivity characteristics shown in FIG. 5.

$$Bb/Gb \approx Bs(\lambda b)/Gs(\lambda b) \qquad (13)$$

with $\lambda b$ representing the wavelength at which $Bi(\lambda)$ achieves the maximum value. Since Gb, $Bs(\lambda)$, $Gs(\lambda)$ and $\lambda b$ in expression (13) are already known, the CPU 101 uses these known values for substitution in expression (13) to determine the value of the signal Bb. With expression (13) above, the B component information (signal Bb) can be estimated based upon the ratio of the sensitivity characteristics $Bs(\lambda b)$ of the B component light at the known B component wavelength $\lambda b$ and the sensitivity characteristics $Gs(\lambda b)$ of the G component light at the wavelength $\lambda b$ and the B component signal value Gb which has been actually obtained.

5. Estimate the Signal Br at a Pixel Position Corresponding to a G Component Color Filter The R component information obtained at a pixel corresponding to a G component color filter is the signal Gr. Assuming that the R component light $(Ri(\lambda))$ has a narrow wave band and is single-color light, the following expression (14) can be deduced from the spectral sensitivity characteristics shown in FIG. 5.

$$Br/Gr \approx Bs(\lambda r)/Gs(\lambda r) \qquad (14)$$

with $\lambda r$ representing the wavelength at which $Ri(\lambda)$ achieves the maximum value. Since Gr, $Bs(\lambda)$, $Gs(\lambda)$ and $\lambda r$ in expression (14) are already known, the CPU 101 uses these known values for substitution in expression (14) to determine the value of the signal Br. With expression (14) above, the R component information (signal Br) can be estimated based upon the ratio of the sensitivity characteristics $Bs(\lambda r)$ of the B component light at the known wavelength $\lambda r$ and the sensitivity characteristics $Gs(\lambda r)$ of the G component light at the wavelength $\lambda r$ and the R component signal value Gr which has been actually obtained.

6. Estimate the Signal Bg at a Pixel Position Corresponding to a G Component Color Filter The G component information obtained at a pixel corresponding to a G component color filter is the signal Gg.

Assuming that the G component light (Gi(λ)) has a narrow wave band and is single-color light, the following expression (15) can be deduced from the spectral sensitivity characteristics shown in FIG. 5.

$$Bg/Gg \approx Bs(\lambda g)/Gs(\lambda g) \qquad (15)$$

with λg representing the wavelength at which Gi(λ) achieves the maximum value. Since Gg, Bs(λ), Gs(λ) and λg in expression (15) are already known, the CPU 101 uses these known values for substitution in expression (15) to determine the value of the signal Bg. With expression (15) above, the G component information (signal Bg) can be estimated based upon the ratio of the sensitivity characteristics Bs(λg) of the B component light at the known wavelength λg and the sensitivity characteristics Gs(λg) of the G component light at the wavelength λg and the G component signal value Gg which has been actually obtained.

7. Estimate the Signal Gg at a Pixel Position Corresponding to an R Component Color Filter The G component information obtained at a pixel corresponding to an R component color filter is the signal Rg. Assuming that the G component light (Gi(λ) has a narrow wave band and is single-color light, the following expression (16) can be deduced from the spectral sensitivity characteristics shown in FIG. 5.

$$Gg/Rg \approx Gs(\lambda g)/Rs(\lambda g) \qquad (16)$$

with λg representing the wavelength at which Gi(λ) achieves the maximum value. Since Rg, Gs(λ), Rs(λ) and λg in expression (16) are already known, the CPU 101 uses these known values for substitution in expression (16) to determine the value of the signal Gg. With expression (16) above, the G component information (signal Gg) can be estimated based upon the ratio of the sensitivity characteristics Gs(λg) of the G component light at the known wavelength λg and the sensitivity characteristics Rs(λg) of the R component light at the wavelength λg and the G component signal value Rg which has been actually obtained.

8. Estimate the Signal Gr at a Pixel Position Corresponding to an R Component Color Filter The R component information obtained at a pixel corresponding to an R component color filter is the signal Rr. Assuming that the R component light (Ri(λ)) has a narrow wave band and is single-color light, the following expression (17) can be deduced from the spectral sensitivity characteristics shown in FIG. 5.

$$Gr/Rr \approx Gs(\lambda r)/Rs(\lambda r) \qquad (17)$$

with λr representing the wavelength at which Ri(λ) achieves the maximum value. Since Rr, Gs(λ), Rs(λ) and λr in expression (17) are already known, the CPU 101 uses these known values for substitution in expression (17) to determine the value of the signal Gr. With expression (17) above, the R component information (signal Gr) can be estimated based upon the ratio of the sensitivity characteristics Gs(λr) of the G component light at the known wavelength λr and the sensitivity characteristics Rs(λr) of the R component light at the wavelength λr and the R component signal value Rr which has been actually obtained.

9. Estimate the Signal Gb at a Pixel Position Corresponding to an R Component Color Filter The B component information obtained at a pixel corresponding to an R component color filter is the signal Rb. Assuming that the B component light (Bi(λ)) has a narrow wave band and is single-color light, the following expression (18) can be deduced from the spectral sensitivity characteristics shown in FIG. 5.

$$Gb/Rb \approx Gs(\lambda b)/Rs(\lambda b) \qquad (18)$$

with λb representing the wavelength at which Bi(λ) achieves the maximum value. Since Rb, Gs(λ), Rs(λ) and λb in expression (18) are already known, the CPU 101 uses these known values for substitution in expression (18) to determine the value of the signal Gb. With expression (18) above, the B component information (signal Gb) can be estimated based upon the ratio of the sensitivity characteristics Gs(λb) of the G component light at the known wavelength λb and the sensitivity characteristics Rs(λb) of the R component light at the wavelength λb and the B component signal value Rb which has been actually obtained.

10. Estimate the Signal Bb at a Pixel Position Corresponding to an R Component Color Filter The B component information obtained at a pixel corresponding to an R component color filter is the signal Rb. Assuming that the B component light (Bi(λ)) has a narrow wave band and is single-color light, the following expression (19) can be deduced from the spectral sensitivity characteristics shown in FIG. 5.

$$Bb/Rb \approx Bs(\lambda b)/Rs(\lambda b) \qquad (19)$$

with b representing the wavelength at which Bi(λ) achieves the maximum value. Since Rb, Bs(λ), Rs(λ) and λb in expression (19) are already known, the CPU 101 uses these known values for substitution in expression (19) to determine the value of the signal Bb. With expression (19) above, the B component information (signal Bb) can be estimated based upon the ratio of the sensitivity characteristics Bs(λb) of the B component light at the known wavelength λb and the sensitivity characteristics Rs(λb) of the R component light at the wavelength λb and the B component signal value Rb which has been actually obtained.

11. Estimate the Signal Br at a Pixel Position Corresponding to an R Component Color Filter The R component information obtained at a pixel corresponding to an R component color filter is the signal Rr. Assuming that the R component light (Ri(λ)) has a narrow wave band and is single-color light, the following expression (20) can be deduced from the spectral sensitivity characteristics shown in FIG. 5.

$$Br/Rr \approx Bs(\lambda r)/Rs(\lambda r) \qquad (20)$$

with λr representing the wavelength at which Ri(λ) achieves the maximum value. Since Rr, Bs(λ), Rs(λ) and λr in expression (20) are already known, the CPU 101 uses these known values for substitution in expression (20) to determine the value of the signal Br. With expression (20) above, the R component information (signal Br) can be estimated based upon the ratio of the sensitivity characteristics Bs(λr) of the B component light at the known wavelength λr and the sensitivity characteristics Rs(λr) of the R component light at the wavelength λr and the R component signal value Rr which has been actually obtained.

12. Estimate the Signal Bg at a Pixel Position Corresponding to a R Component Color Filter The G component information obtained at a pixel corresponding to an R component color filter is the signal Rg. Assuming that the G component light (Gi(λ)) has a narrow wave band and is single-color light, the following expression (21) can be deduced from the spectral sensitivity characteristics shown in FIG. 5.

$$Bg/Rg \approx Bs(\lambda g)/Rs(\lambda g) \quad (21)$$

with λg representing the wavelength at which Gi(λ) achieves the maximum value. Since Rg, Bs(λ), Rs(λ) and λg in expression (21) are already known, the CPU 101 uses these known values for substitution in expression (21) to determine the value of the signal Bg. With expression (21) above, the G component information (signal Bg) can be estimated based upon the ratio of the sensitivity characteristics Bs(λg) of the B component light at the known wavelength λg and the sensitivity characteristics Rs(λg) of the R component light at the wavelength λg and the G component signal value Rg which has been actually obtained.

13. Estimate the signal Gg at a pixel position corresponding to a B component color filter The G component information obtained at a pixel corresponding to a B component color filter is the signal Bg. Assuming that the G component light (Gi(λ)) has a narrow wave band and is single-color light, the following expression (22) can be deduced from the spectral sensitivity characteristics shown in FIG. 5.

$$Gg/Bg \approx Gs(\lambda g)/Bs(\lambda g) \quad (22)$$

with λg representing the wavelength at which Gi(λ) achieves the maximum value, Since Bg, Gs(λ), Bs(λ) and λg in expression (22) are already known, the CPU 101 uses these known values for substitution in expression (22) to determine the value of the signal Gg. With expression (22) above, the G component information (signal Gg) can be estimated based upon the ratio of the sensitivity characteristics Gs(λg) of the G component light at the known wavelength λg and the sensitivity characteristics Bs(λg) of the B component light at the wavelength λg and the G component signal value Bg which has been actually obtained.

14. Estimate the Signal Gr at a Pixel Position Corresponding to a B Component Color Filter The R component information obtained at a pixel corresponding to a B component color filter is the signal Br. Assuming that the R component light (Ri(λ)) has a narrow wave band and is single-color light, the following expression (23) can be deduced from the spectral sensitivity characteristics shown in FIG. 5.

$$Gr/Br \approx Gs(\lambda r)/Bs(\lambda r) \quad (23)$$

with λr representing the wavelength at which Ri(λ) achieves the maximum value. Since Br, Gs(λ), Bs(λ) and λr in expression (23) are already known, the CPU 101 uses these known values for substitution in expression (23) to determine the value of the signal Gr. With expression (23) above, the R component information (signal Gr) can be estimated based upon the ratio of the sensitivity characteristics Gs(λr) of the G component light at the known wavelength λr and the sensitivity characteristics Bs(λr) of the B component light at the wavelength λr and the R component signal value Br which has been actually obtained.

15. Estimate the Signal Gb at a Pixel Position Corresponding to a B Component Color Filter The B component information obtained at a pixel corresponding to a B component color filter is the signal Bb. Assuming that the B component light (Bi(λ)) has a narrow wave band and is single-color light, the following expression (24) can be deduced from the spectral sensitivity characteristics shown in FIG. 5.

$$Gb/Bb \approx Gs(\lambda b)/Bs(\lambda b) \quad (24)$$

with λb representing the wavelength at which Bi(λ) achieves the maximum value. Since Bb, Gs(λ), Bs(λ) and λb in expression (24) are already known, the CPU 101 uses these known values for substitution in expression (24) to determine the value of the signal Gb. With expression (24) above, the B component information (signal Gb) can be estimated based upon the ratio of the sensitivity characteristics Gs(λb) of the G component light at the known wavelength λb and the sensitivity characteristics Bs(λb) of the B component light at the wavelength λb and the B component signal value Bb which has been actually obtained.

16. Estimate the Signal Rr at a Pixel Position Corresponding to a B Component Color Filter The R component information obtained at a pixel corresponding to a B component color filter is the signal Br. Assuming that the R component light (Ri(λ)) has a narrow wave band and is single-color light, the following expression (25) can be deduced from the spectral sensitivity characteristics shown in FIG. 5.

$$Rr/Br \approx Rs(\lambda r)/Bs(\lambda r) \quad (25)$$

with λr representing the wavelength at which Ri(λ) achieves the maximum value. Since Br, Rs(λ), Bs(λ) and λr in expression (25) are already known, the CPU 101 uses these known values for substitution in expression (25) to determine the value of the signal Rr. With expression (25) above, the R component information (signal Rr) can be estimated based upon the ratio of the sensitivity characteristics Rs(λr) of the R component light at the known wavelength λr and the sensitivity characteristics Bs(λr) of the B component light at the wavelength λr and the R component signal value Br which has been actually obtained.

17. Estimate the Signal Rg at a Pixel Position Corresponding to a B Component Color Filter The G component information obtained at a pixel corresponding to a B component color filter is the signal Bg. Assuming that the G component light (Gi(λ)) has a narrow wave band and is single-color light, the following expression (26) can be deduced from the spectral sensitivity characteristics shown in FIG. 5.

$$Rg/Bg \approx Rs(\lambda g)/Bs(\lambda g) \quad (26)$$

with λg representing the wavelength at which Gi(λ) achieves the maximum value. Since Bg, Rs(λ), Bs(λ) and λg in expression (26) are already known, the CPU 101 uses these known values for substitution in expression (26) to determine the value of the signal Rg. With expression (26) above, the G component information (signal Rg) can be estimated based upon the ratio of the sensitivity characteristics Rs(λg) of the R component light at the known wavelength λg and the sensitivity characteristics Bs(λg) of the B component light at the wavelength λg and the G component signal value Bg which has been actually obtained.

18. Estimate the Signal Rb at a Pixel Position Corresponding to a B Component Color Filter The B component information obtained at a pixel corresponding to a B component color filter is the signal Bb. Assuming that the B component light (Bi(λ)) has a narrow wave band and is single-color light, the following expression (27) can be deduced from the spectral sensitivity characteristics shown in FIG. 5.

$$Rb/Bb \approx Rs(\lambda b)/Bs(\lambda b) \tag{27}$$

with λb representing the wavelength at which Bi(λ) achieves the maximum value. Since Bb, Rs(λ), Bs(λ) and λb in expression (27) are already known, the CPU 101 uses these known values for substitution in expression (27) to determine the value of the signal Rb. With expression (27) above, the B component information (signal Rb) can be estimated based upon the ratio of the sensitivity characteristics Rs(λb) of the R component light at the known wavelength λb and the sensitivity characteristics Bs(λb) of the B component light at the wavelength λb and the B component signal value Bb which has been actually obtained.

The image-capturing signal values can be calculated by using the color component information obtained through estimation as described above for substitution in expressions (5), (7) and (9).

It is to be noted that if the denominator in any of expressions (10) through (27) assumes a value close to 0, the results of the corresponding arithmetic operation may be inaccurate. In such a case, interpolation processing of the known art such as averaging interpolation processing whereby an average value is calculated based upon the signal values at pixels around the target pixel (the pixel undergoing the estimation) may be executed to obtain color component information missing at each pixel position.

Figure 6:
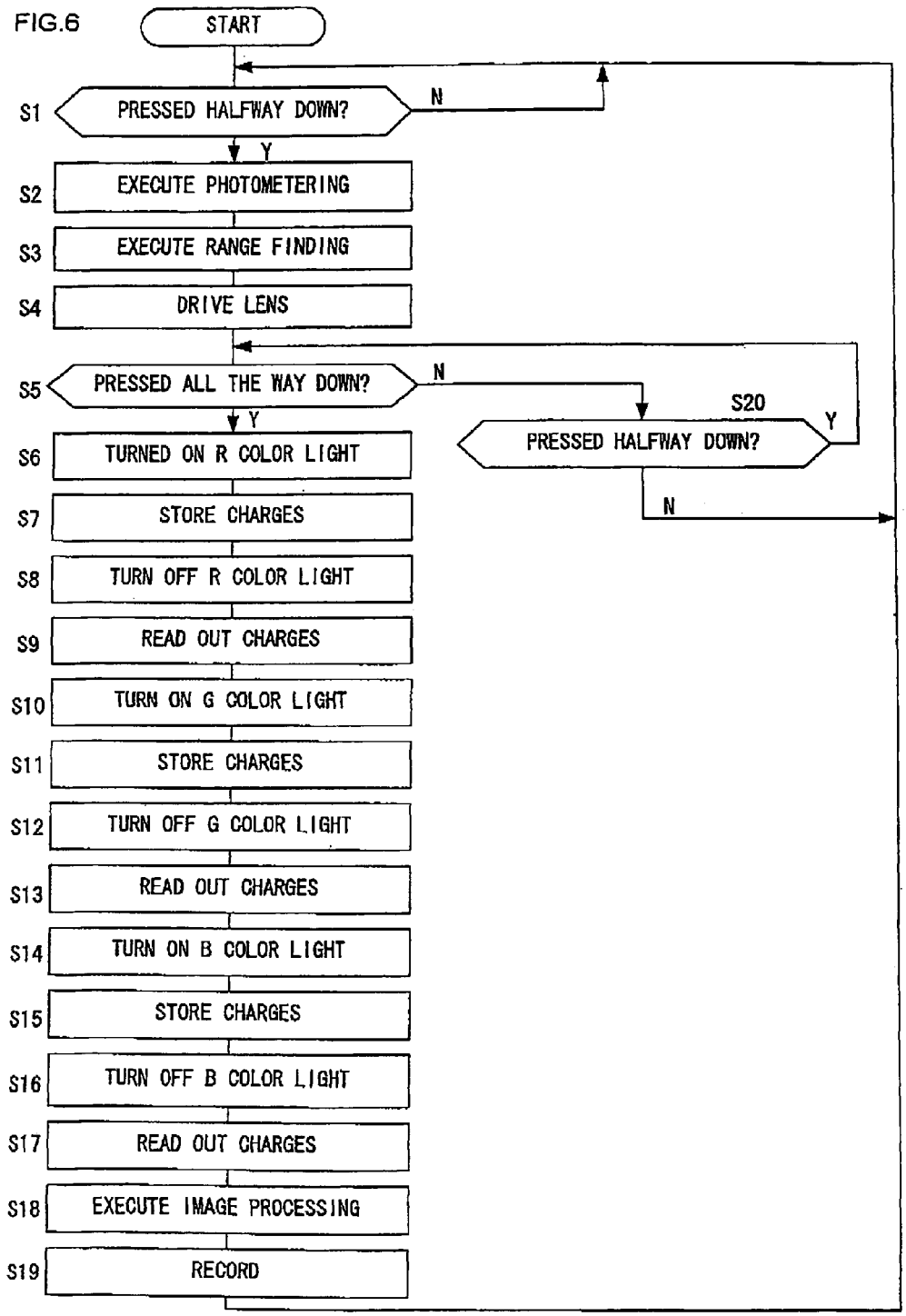
FIG. 6 presents a flowchart of an example of camera processing that may be executed by the CPU.

An example of camera processing that may be executed by the CPU 101 in the electronic camera 10 explained above is now described in reference to the flow chart presented in FIG. 6. The processing in FIG. 6 is started as the main switch (not shown) of the camera is turned on.

In step S1 in FIG. 6, the CPU makes a decision as to whether or not a halfway press operation has been performed. The CPU 101 makes an affirmative decision in step S1 if a halfway press operation signal has been input from a shutter release halfway press switch constituting the operating member 107 to proceed to step S2, whereas it makes a negative decision in step S1 if no halfway press operation signal has been input and the same decision-making processing is repeatedly executed subsequently.

In step S2, the CPU 101 executes photometering processing before proceeding to step S3. The CPU 101 calculates a control exposure value based upon the photometering results. In step S3, the CPU 101 outputs a command to the range finding device 102 to execute range finding processing and then the operation proceeds to step S4.

In step S4, the CPU 101 outputs a command for the focus lens drive mechanism (not shown) to drive the focus lens (not shown) included in the photographic lens 20 to the focus matched position, and then the operation proceeds to step S5.

In step S5, the CPU 101 makes a decision as to whether or not a full press operation has been performed. The CPU 101 makes an affirmative decision in step S5 if a full press operation signal has been input from a shutter release full press switch constituting part of the operating member 107 to proceed to step S6, whereas it makes a negative decision in step S5 if no full press operation signal has been input to proceed to step S20.

In step S6, the CPU 101 outputs a command for the individual light emission circuits 132 at the illuminating device 13 to turn on only the R component light emitting elements 131*r* among the light emitting elements corresponding to the R color component, the G color component and the B color component, and then the operation proceeds to step S7. In step S7, the CPU 101 engages the image-capturing element 121 in charge storage before proceeding to step S8. The length of time over which the electrical charges are stored constitutes the exposure period which corresponds to the control exposure value.

In step S8, the CPU 101 outputs a command for the individual light emission circuits 132 in the illuminating device 13 to turn off the R component light emitting elements 131*r*, before proceeding to step S9. In step S9, the CPU 101 reads out the image-capturing signals from the image-capturing element 121 and then the operation proceeds to step S10. Thus, the digitized image data Ri are stored into the buffer memory (not shown).

In step S10, the CPU 101 outputs a command for the individual light emission circuits 132 at the illuminating device 13 to turn on only the G component light emitting elements 131*g*, and then the operation proceeds to step S11. In step S11, the CPU 101 engages the image-capturing element 121 in charge storage before proceeding to step S12. The length of time over which the electrical charges are stored constitutes the exposure period which corresponds to a control exposure value.

In step S12, the CPU 101 outputs a command for the individual light emission circuits 132 in the illuminating device 13 to turn off the G component light emitting elements 131*g*, before proceeding to step S13. In step S13, the CPU 101 reads out the image-capturing signals from the image-capturing element 121 and then the operation proceeds to step S14. Thus, the digitized image data Gi are stored into the buffer memory (not shown).

In step S14, the CPU 101 outputs a command for the individual light emission circuits 132 at the illuminating device 13 to turn on only the B component light emitting elements 131*b*, and then the operation proceeds to step S15. In step S15, the CPU 101 engages the image-capturing element 121 in charge storage before proceeding to step S16. The length of time over which the electrical charges are stored constitutes the exposure period which corresponds to a control exposure value.

In step S16, the CPU 101 outputs a command for the individual light emission circuits 132 in the illuminating device 13 to turn off the B component light emitting elements 131*b*, before proceeding to step S17. In step S17, the CPU 101 reads out the image-capturing signals from the image-capturing element 121 and then the operation proceeds to step S18. Thus, the digitized image data Bi are stored into the buffer memory (not shown).

In step S18, the CPU 101 executes the image processing. The image processing includes the processing for obtaining the color component information through the estimation described earlier (in 1 through 18 above) and the white balance processing. Once the specific types of image processing are completed, the CPU 101 proceeds to step S19. In step S19, the CPU 101 records the image data into the recording medium 126 and then the operation returns to step S1. The sequence of photographing processing thus ends.

In step S20, to which the operation proceeds after making a negative decision in step S5, the CPU 101 makes a decision as to whether or not a halfway press operation is ongoing. The CPU 101 makes an affirmative decision in step S20 if the halfway press operation signal has continuously been input from the shutter release halfway press switch constituting part of the operating member 107 to return to step S5, whereas it makes a negative decision in step S20 if the halfway press operation signal is no longer being input to return to step S1.

The embodiment explained above is now summarized.

(1) The illuminating device 13 includes as its light source the LED modules 131 each constituted as a three-color (three-wavelength) light source capable of emitting light in separate maximal light emission wavelengths each corresponding to one of the three primary colors of light, i.e., blue (the B component), green (the G component) and red (the R component). Spectral emission intensity characteristics such as Bi(λ), Gi(λ) and Ri(λ) in FIG. 4 are achieved.

(2) The maximal light emission wavelengths at the LED modules 131 are made to correspond to the maximal transmission wavelengths in the spectral transmission characteristics of the color filter 121a disposed at the image-capturing surface of the image-capturing element 121. An example of the spectral sensitivity characteristics obtained by combining the spectral transmission characteristics of the color filter 121a, the wavelength sensitivity characteristics of the photo diodes constituting the pixels at the image-capturing element 121 and the infrared light cutoff characteristics of the infrared blocking filter (not shown) disposed at the image-capturing surface of the image-capturing element 121 separately from the color filter 121a is indicated as Bs(λ), Gs(λ) and Rs(λ) in FIG. 5. By making the maximal light emission wavelengths and the maximal spectral transmission wavelengths correspond to each other, it is ensured that the three primary color components of light are received efficiently at the image-capturing element 121. The improved three primary color component sensing efficiency improves the signal levels of the image-capturing signals and ultimately, an image with a good SN ratio is achieved. In addition, since the LED modules 131 do not need to emit light with unnecessarily high light emission intensity, the power consumption can be lowered.

(3) The three maximal light emission wavelengths at the LED modules 131 are all contained within each of the "hills" indicating the transmission ranges in the spectral sensitivity characteristics, and each image-capturing signal value is thus indicated as the sum of the values of the light reception signals corresponding to the different color components.

(4) The light emitting elements 131r, the light emitting elements 131g and the light emitting elements 131b at the LED modules 131 are turned on through time division, and the image-capturing element 121 is engaged in an electrical charge storage with the timing with which the light emitting elements corresponding to a given color component are turned on. Thus, image-capturing signals Ri, Gi and Bi corresponding to the individual color components are obtained.

(5) Data indicating the spectral emission intensity characteristics Bi(λ), Gi(λ) and Ri(λ) and the spectral sensitivity characteristics Bs(λ), Gs(λ) and Rs(λ) are stored in advance in the nonvolatile memory (not shown) within the CPU 101. Based upon the sensitivity ratios of the three maximal light emission wavelengths contained in each of the "hills" in the spectral sensitivity characteristics and the signal values that are actually obtained (from an image-capturing signal corresponding to color components different from the color assigned to the color filter disposed at the target pixel position), information on the different color components is obtained through estimation for the target pixel. Unlike color component information generated for the target pixel by referencing image data (color component information) at pixels surrounding the target pixel, the color component information thus obtained is not affected by the signals at the nearby pixels and, as a result, the occurrence of color artifacts can be minimized even over an area where the brightness or the color of the subject image changes abruptly.

While an explanation is given above on an example in which the illuminating device 13 comprising the LED modules 131 is a built-in illuminating device, the present invention may be adopted in conjunction with an illuminating device mounted at the electronic camera body 10 as an external component instead.

While an explanation is given above on an example in which the LED modules 131 are white color LED modules each comprising three primary color light emitting elements, red color LEDs, green color LEDs and blue color LEDs disposed independently of one another may be used and the main subject may be illuminated with illuminating light from the separate LEDs, instead.

While an explanation is given above on an example in which the color filter assumes a Bayer array, the present invention may be adopted in conjunction with color filters with other filter arrays including a Delta array.

The image-capturing element 121 may be constituted with a CMOS sensor as well.

While an explanation is given above on an example in which the present invention is adopted in an electronic camera, a program for image restoration that includes the processing for obtaining through estimation the color component information as described earlier in 1 through 18, which is prepared in advance, may be installed in a personal computer or the like to enable the personal computer or the like to function as an image restoration apparatus. In such a case, the personal computer can be used as an image restoration apparatus by executing the program loaded into a data storage device of the personal computer. The program may be loaded by inserting the recording medium having stored therein the program at the personal computer, or it may be loaded into the personal computer or the like via a network.

Figure 7:
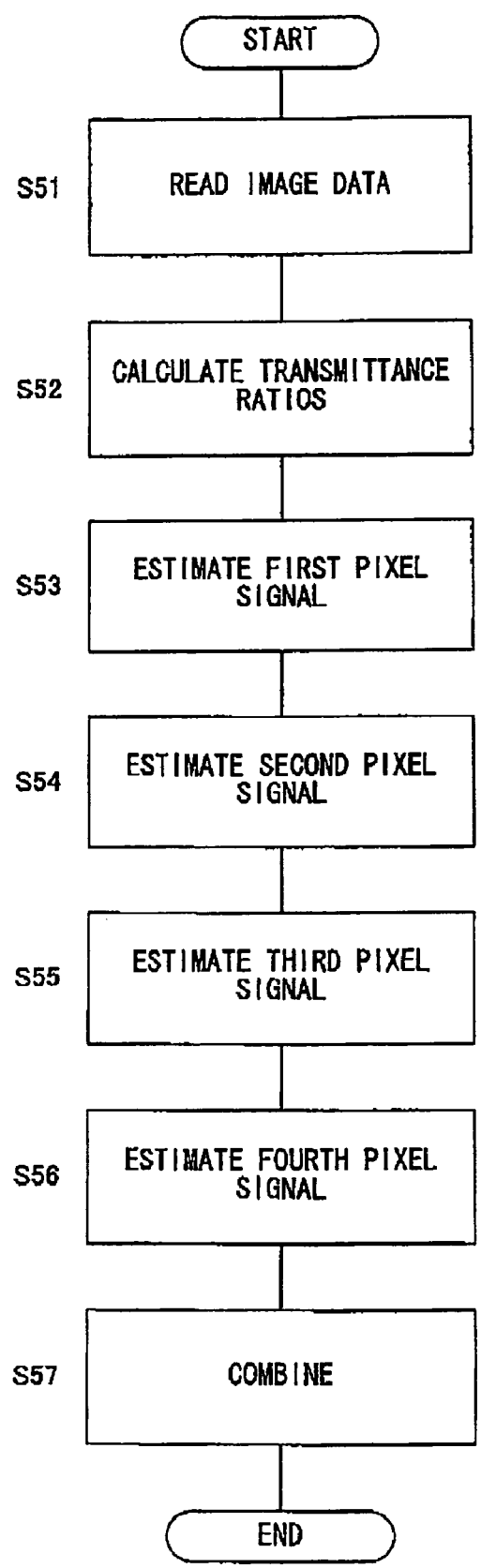
FIG. 7 presents a flowchart of the image processing program flow.

FIG. 7 presents a flowchart of an image processing program in conformance to which image restoration is executed. In step S51 in FIG. 7, the computer reads image data and then the operation proceeds to step S52. Through the processing in step S51, image-capturing signals Ri, Gi and Bi corresponding to the individual color components are read.

In step S52, the computer calculates transmittance ratios, before proceeding to step S53. As a result, transmittance ratios equivalent to the right sides in expressions (10) through (27) are obtained. In step S53, the computer executes first pixel signal estimate processing, before proceeding to step S54. The operations expressed in (10), (12), (13) and (14) correspond to the first pixel signal estimate processing.

In step S54, the computer executes second pixel signal estimate processing, before proceeding to step S55. The operations expressed in (11) and (15) correspond to the second pixel signal estimate processing.

In step S55, the computer executes third pixel signal estimate processing, before proceeding to step S56. The operations expressed in (17), (18), (23) and (24) correspond to the third pixel signal estimate processing.

In step S56, the computer executes fourth pixel signal estimate processing, before proceeding to step S57. The operations expressed in (16), (19), (20), (21), (22), (25), (26) and (27) correspond to the fourth pixel signal estimate processing.

In step S57, the computer executes composite processing before the processing shown in FIG. 7 ends. The operations expressed in (5), (7) and (9) correspond to the composite processing. As a result, an image that contains information corresponding to the three color components R, G and B at each pixel position is obtained.

In the explanation provided above, the maximal (central) light emission wavelengths at the light source in the illuminating device 13 and the maximal transmission wavelengths at the color filter 121a disposed at the image-capturing surface of the image-capturing element 121 each correspond to R color, G color or B color. The present invention may be adopted in image restoration achieved in conjunction with a wavelength combination of two color components such as B (blue) and Y (yellow) instead of the image restoration achieved in conjunction with the three color component wavelength combination.

Figure 8:
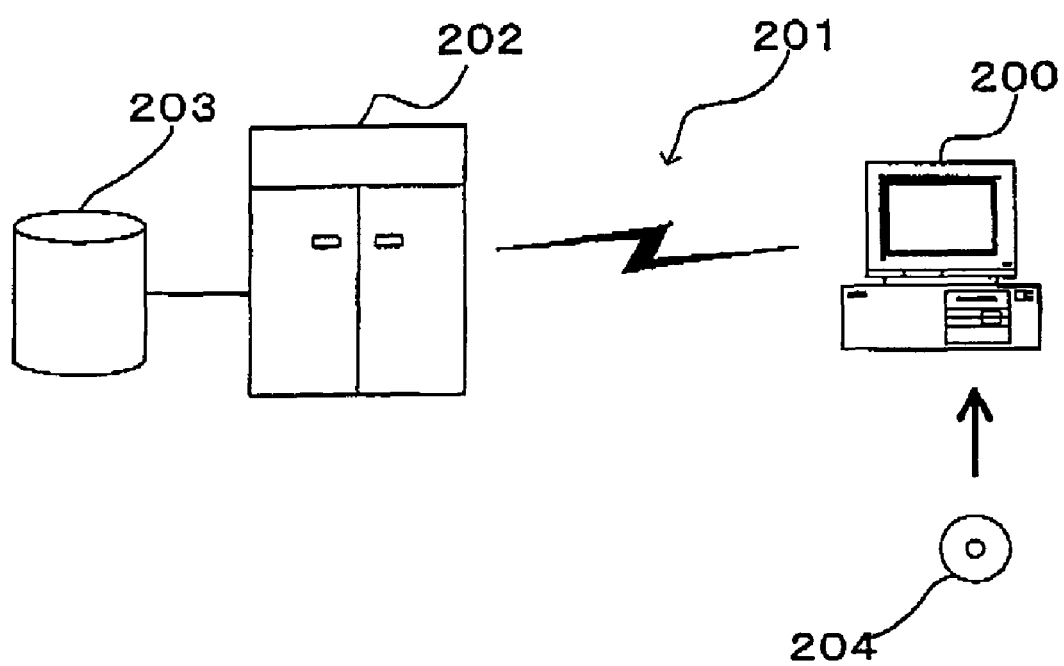
FIG. 8 shows how the program may be provided to a personal computer.

FIG. 8 shows how the program described above may be provided to the personal computer via a recording medium such as a CD-ROM or through a data signal on the Internet or the like. A personal computer 200 receives the program via a CD-ROM 204. The personal computer 200 also has a function of achieving a connection with a communication line 201. The computer 202 is a server computer that provides the program stored in a recording medium such as a hard disk 203. The communication line 201 may be a communication line for Internet communication, personal computer communication or the like, or it may be a dedicated communication line. The computer 202 reads out the program from the hard disk 203 and transmits the program to the personal computer 200 via the communication line 201. Namely, the program embodied as a data signal on a carrier wave is transmitted via the communication line 201. Thus, the program can be distributed as a computer-readable computer program product adopting any of various modes such as a recording medium and a carrier wave.

The above described embodiment is an example and various modifications can be made without departing from the spirit and scope of the invention.

What is claimed is:

1. An image-capturing device, comprising:
   an image-capturing element that includes a first color filter that allows first color component light corresponding to a first color component to be transmitted and a second color filter that allows second color component light corresponding to a second color component different from the first color component to be transmitted, each formed in correspondence to one of light receiving pixels, and captures an image of a subject;
   an image-capturing control unit that engages the image-capturing element in a first image-capturing operation while the subject is illuminated with the first color component light and engages the image-capturing element in a second image-capturing operation while the subject is illuminated with the second color component light; and
   a pixel signal generating unit that generates a pixel signal corresponding to the first color component or the second color component at each pixel position based upon spectral characteristics of the first color filter, spectral characteristics of the second color filter, a pixel signal obtained through the first image-capturing operation and a pixel signal obtained through the second image-capturing operation.

2. An image-capturing device according to claim 1, wherein the pixel signal generating unit comprises:
   (1) a first pixel signal estimating unit which, based upon a ratio of a transmittance of the first color component light at the first color filter and a transmittance of the first color component light at the second color filter and a pixel signal corresponding to the first color component obtained through the first image-capturing operation from a pixel at which the second color filter is formed, estimates a pixel signal corresponding to the first color component that would be obtained if the first color filter was formed at the pixel;
   (2) a second pixel signal estimating unit which, based upon a ratio of a transmittance of the second color component light at the first color filter and a transmittance of the second color component light at the second color filter and a pixel signal corresponding to the second color component obtained through the second image-capturing operation from the pixel at which the second color filter is formed, estimates a pixel signal corresponding to the second color component that would be obtained if the first color filter was formed at the pixel;
   (3) a third pixel signal estimating unit which, based upon a ratio of the transmittance of the first color component light at the second color filter and the transmittance of the first color component light at the first color filter and a pixel signal corresponding to the first color component obtained through the first image-capturing operation from a pixel at which the first color filter is formed, estimates a pixel signal corresponding to the first color component that would be obtained if the second color filter was formed at the pixel; and
   (4) a fourth pixel signal estimating unit which, based upon a ratio of the transmittance of the second color component light at the second color filter and the transmittance of the second color component light at the first color filter and a pixel signal corresponding to the second color component obtained through the second image-capturing operation from the pixel at which the first color filter is formed, estimates a pixel signal corresponding to the second color component that would be obtained if the second color filter was formed at the pixel.

3. An image-capturing device according to claim 2, further comprising an image composition unit that generates:
   (1) a post-composition pixel signal corresponding to the first color component for the pixel at which the second color filter is formed by calculating a sum of the pixel signal corresponding to the first color component having been estimated by the first pixel signal estimating unit and the pixel signal corresponding to the second color component having been estimated by the second pixel signal estimating unit; and
   (2) a post-composition pixel signal corresponding to the second color component for the pixel at which the first color filter is formed by calculating a sum of the pixel signal corresponding to the first color component having been estimated by the third pixel signal estimating unit and the pixel signal corresponding to the second color component having been estimated by the fourth pixel signal estimating unit.

4. An image-capturing device according to claim 1, wherein:
   through the first color filter and the second color filter, the first color component light and the second color component light are respectively transmitted; and
   the transmittance of the second color component light is higher than the transmittance of the first color component light at the second color filter, and the transmittance of the first color component light is higher than the transmittance of the second color component light at the first color filter.

5. An image-capturing device according to claim 1, wherein:
   the first color component and the second color component constitute three primary colors of light.

6. An image-capturing device according to claim 1, further comprising:
   an illuminating device capable of emitting the first color component light and the second color component light separately from each other, wherein:

the image-capturing control unit executes control so as to engage the illuminating device to emit the first component light and engage the image-capturing element in the first image-capturing operation, and executes control so as to engage the illuminating device to emit the second component light and engage the image-capturing element in the second image-capturing operation.

7. An image-capturing device according to claim 1, wherein:
the pixel signal generating unit generates a pixel signal corresponding to the second color component for a pixel at which the first color filter is formed and generates a pixel signal corresponding to the first color component for a pixel at which the second color filter is formed, based upon the spectral characteristics of the first color filter, the spectral characteristics of the second color filter, the pixel signal obtained through the first image-capturing operation and the pixel signal obtained through the second image-capturing operation.

8. An image-capturing device according to claim 1, wherein:
the image-capturing element includes the first color filter, the second color filter and a third color filter which allows third color component light corresponding to a third color component different from the first color component and the second color component to be transmitted, each formed in correspondence to one of the light receiving pixels;
the image-capturing control unit engages the image-capturing element in a third image-capturing operation while the subject is illuminated with the third color component light; and
the pixel signal generating unit generates a pixel signal corresponding to the second color component and a pixel signal corresponding to the third color component for a pixel for the first color component, generates a pixel signal corresponding to the first color component and a pixel signal corresponding to the third color component for a pixel for the second color component and generates a pixel signal corresponding to the first color component and a pixel signal corresponding to the second color component for a pixel for the third color component, based upon the spectral characteristics of the first color filter, the spectral characteristics of the second color filter, spectral characteristics of the third color filter, the pixel signal obtained through the first image-capturing operation, the pixel signal obtained through the second image-capturing operation and the pixel signal obtained through the third image-capturing operation.

9. An image-capturing device according to claim 8, wherein:
the first color component, the second color component and the third color component constitute three primary colors of light.

10. An image capturing device according to claim 1, wherein:
a maximal transmission wavelength of the first color filter corresponds to a wavelength of the first color component light; and
a maximal transmission wavelength of the second color filter corresponds to a wavelength of the second color component light.

11. An image processing device, comprising:
an acquisition device that obtains a first image and a second image captured at an image-capturing element that includes a first color filter allowing first color component light corresponding to a first color component to be transmitted and a second color filter allowing second color component light corresponding to a second color component different from the first color component to be transmitted, each formed in correspondence to one of light receiving pixels, respectively while a subject is illuminated with the first color component light and while the subject is illuminated with the second color component light; and
a pixel signal generating unit that generates a pixel signal corresponding to the first color component or a pixel signal corresponding to the second color component at each pixel position based upon spectral characteristics of the first color filter, spectral characteristics of the second color filter, a pixel signal constituting the first image and a pixel signal constituting the second image.

12. An image processing device according to claim 11, wherein the pixel signal generating unit comprises:
(1) a first pixel signal estimating unit which, based upon a ratio of transmittance of the first color component light at the first color filter and a transmittance of the first color component light at the second color filter and a pixel signal corresponding to the first color component that constitutes the first image and is obtained from a pixel at which the second color filter is formed, estimates a pixel signal corresponding to the first color component that would be obtained if the first color filter was formed at the pixel;
(2) a second pixel signal estimating unit which, based upon a ratio of transmittance of the second color component light at the first color filter and a transmittance of the second color component light at the second color filter and a pixel signal corresponding to the second color component that constitutes the second image and is obtained from the pixel at which the second color filter is formed, estimates a pixel signal corresponding to the second color component that would be obtained if the first color filter was formed at the pixel;
(3) a third pixel signal estimating unit which, based upon a ratio of the transmittance of the first color component light at the second color filter and the transmittance of the first color component light at the first color filter and a pixel signal corresponding to the first color component that constitutes the first image and is obtained from a pixel at which the first color filter is formed, estimates a pixel signal corresponding to the first color component that would be obtained if the second color filter was formed at the pixel; and
(4) a fourth pixel signal estimating unit which, based upon a ratio of the transmittance of the second color component light at the second color filter and the transmittance of the second color component light at the first color filter and a pixel signal corresponding to the second color component that constitutes the second image and is obtained from the pixel at which the first color filter is formed, estimates a pixel signal corresponding to the second color component that would be obtained if the second color filter was formed at the pixel.

13. An image-processing device according to claim 12, further comprising an image composition unit that generates:
(1) a post-composition pixel signal corresponding to the first color component for the pixel at which the second color filter is formed by calculating a sum of the pixel signal corresponding to the first color component having been estimated by the first pixel signal estimating unit and the pixel signal corresponding to the second color component having been estimated by the second pixel signal estimating unit; and (2) a post-composition pixel signal corresponding to the second color component for the pixel at which the first color filter is formed by calculating a sum of the pixel signal corresponding to the first color component having been estimated by the third pixel signal estimating unit and the pixel signal corresponding to the second color component having been estimated by the fourth pixel signal estimating unit.

14. An image processing device according to claim 11, wherein:
the pixel signal generating unit generates a pixel signal corresponding to the second color component for a pixel at which the first color filter is formed and generates a pixel signal corresponding to the first color component for a pixel at which the second color filter is formed, based upon the spectral characteristics of the first color filter, the spectral characteristics of the second color filter, the pixel signal constituting the first image and the pixel signal constituting the second image.

15. An image processing device according to claim 11, wherein:
the acquisition device obtains the first image, the second image and a third image obtained at an image-capturing element, which includes the first color filter allowing the first color component light corresponding to the first color component to be transmitted, the second color filter allowing the second color component light corresponding to the second color component different from the first color component to be transmitted and a third color filter allowing third color component light corresponding to a third color component different from the first color component and the second color component to be transmitted, each formed in correspondence to one of light receiving pixels, respectively while a subject is illuminated with the first color component light, while the subject is illuminated with the second color component light and while the subject is illuminated with the third color component light; and
the pixel signal generating unit generates a pixel signal corresponding to the second color component and a pixel signal corresponding to the third color component for a pixel for the first color component, generates a pixel signal corresponding to the first color component and a pixel signal corresponding to the third color component for a pixel for the second color component and generates a pixel signal corresponding to the first color component and a pixel signal corresponding to the second color component for a pixel for the third color component based upon the spectral characteristics of the first color filter, the spectral characteristics of the second color filter, spectral characteristics of the third color filter, the pixel signal constituting the first image, the pixel signal constituting the second image and a pixel signal constituting the third image.

16. An image processing device according to claim 11, wherein
a maximal transmission wavelength of the first color filter corresponds to a wavelength of the first color component light; and
a maximal transmission wavelength of the second color filter corresponds to a wavelength of the second color component light.

17. A computer readable non-transitory medium having encoded thereon a computer-readable program comprising a set of instructions when executed by a computer to implement a method for image composition processing, the method comprising the steps of:

(1) image acquisition processing for obtaining a first image and a second image captured at an image-capturing element, which includes a first color filter allowing first color component light corresponding to a first color component to be transmitted and a second color filter allowing second color component light corresponding to a second color component different from the first color component to be transmitted, each formed in correspondence to one of light receiving pixels, respectively while a subject is illuminated with the first color component light and while the subject is illuminated with the second color component light;

(2) first pixel signal estimate processing for estimating, based upon a ratio of a transmittance of the first color component light at the first color filter and a transmittance of the first color component light at the second color filter and a pixel signal corresponding to the first color component that constitutes the first image and is obtained from a pixel at which the second color filter is formed, a pixel signal corresponding to the first color component that would be obtained if the first color filter was formed at the pixel;

(3) second pixel signal estimate processing for estimating, based upon a ratio of a transmittance of the second color component light at the first color filter and a transmittance of the second color component light at the second color filter and a pixel signal corresponding to the first color component that constitutes the second image and is obtained from the pixel at which the second color filter is formed, a pixel signal corresponding to the second color component that would be obtained if the first color filter was formed at the pixel;

(4) third pixel signal estimate processing for estimating, based upon a ratio of the transmittance of the first color component light at the second color filter and the transmittance of the first color component light at the first color filter and a pixel signal corresponding to the first color component that constitutes the first image and is obtained from a pixel at which the first color filter is formed, a pixel signal corresponding to the first color component that would be obtained if the second color filter was formed at the pixel;

(5) fourth pixel signal estimate processing for estimating, based upon a ratio of the transmittance of the second color component light at the second color filter and the transmittance of the second color component light at the first color filter and a pixel signal corresponding to the second color component that constitutes the second image and is obtained from the pixel at which the first color filter is formed, a pixel signal corresponding to the second color component that would be obtained if the second color filter was formed at the pixel; and (6) image composition processing for generating a post-composition pixel signal corresponding to the first color component for the pixel at which the second color filter is formed by calculating a sum of the pixel signal corresponding to the first color component having been estimated through the first pixel signal estimate processing and the pixel signal corresponding to the second color component having been estimated through the second pixel signal estimate processing and for generating a post-composition pixel signal corresponding to the second color component for the pixel at which the first color filter is formed by calculating a sum of the pixel signal corresponding to the first color component having been estimated through the third pixel signal estimate processing and the pixel signal corresponding to the second color component having been estimated through the fourth pixel signal estimate processing.

18. The computer readable non-transitory medium according to claim 17, wherein the computer readable non-transitory medium is a recording medium on which the computer-readable program is recorded.

19. The computer readable non-transitory medium according to claim 17, wherein a maximal transmission wavelength of the first color filter corresponds to a wavelength of the first color component light; and a maximal transmission wavelength of the second color filter corresponds to a wavelength of the second color component light.

* * * * *